United States Patent [19]

Sehlbach et al.

[11] 4,203,306
[45] May 20, 1980

[54] TELESCOPING POWER TAKE-OFF SHAFT WITH LOCKABLE LENGTH ADJUSTMENT

[75] Inventors: Gerd Sehlbach; Ditmar Klischat, both of Essen, Fed. Rep. of Germany

[73] Assignee: Gelenkwellenbau GmbH, Essen, Fed. Rep. of Germany

[21] Appl. No.: 952,323

[22] Filed: Oct. 18, 1978

[30] Foreign Application Priority Data

Oct. 21, 1977 [DE] Fed. Rep. of Germany ....... 2747319

[51] Int. Cl.² .............................................. F16D 3/06
[52] U.S. Cl. ......................................... 64/23; 403/370
[58] Field of Search .............. 64/23, 4; 403/370, 372, 403/374, 367, 109, 110; 285/343, 382.7, 89

[56] References Cited

U.S. PATENT DOCUMENTS

| 1,044,299 | 11/1912 | Trundle | 403/370 |
|---|---|---|---|
| 2,174,223 | 9/1939 | Fraventhal et al. | 64/23 |
| 2,767,564 | 10/1956 | Green | 285/89 |
| 2,823,935 | 2/1958 | Wurzburger | 285/343 |
| 3,180,649 | 4/1965 | Heygate | 285/89 |
| 3,284,114 | 11/1966 | McCord et al. | 403/370 |
| 3,367,142 | 2/1968 | Grooves et al. | 64/23 |
| 3,400,558 | 9/1968 | Haines | 64/23 |
| 3,933,012 | 1/1976 | Ketchum | 64/23 |
| 3,940,948 | 3/1976 | Schultenkamper | 64/23 |
| 3,970,336 | 7/1976 | O'Sickey et al. | 285/382.7 |

*Primary Examiner*—Ira S. Lazarus
*Attorney, Agent, or Firm*—Toren, McGeady and Stanger

[57] ABSTRACT

In an adjustable telescoping power take-off shaft an inner shaft extends into splined engagement with an outer shaft. An adapter sleeve encloses an axially extending part of the outer shaft and a locking assembly, including a clamp nut threaded onto the sleeve and a retainer ring located within the nut, locks the inner and outer shafts in position after the length adjustment is made.

8 Claims, 3 Drawing Figures

TELESCOPING POWER TAKE-OFF SHAFT WITH LOCKABLE LENGTH ADJUSTMENT

SUMMARY OF THE INVENTION

The present invention is directed to a telescoping power take-off shaft including a pair of spaced swivel joints with a telescoping shaft extending between and connecting the swivel joint, and, more particularly, it concerns the structure of the telescoping shaft formed of an inner and outer shaft in splined inter-engagement and an assembly for locking the two shafts together after the length of the telescoping shaft is adjusted.

Telescoping power take-off shafts of this type are used in connecting a machine to a drive unit such as used in a rolling mill.

There are known telescoping shafts whose axially movable parts are secured against movement by means of a rubber ring, note British Pat. Nos. 1,185,624 and 1,203,245. These known locking arrangements have the disadvantage that, due to the large cone or bevel angle, a sufficient contraction cannot be obtained so that the exact determination of the axial force which can be absorbed by the rubber ring is inexact and very difficult to determine. Furthermore, there is the disadvantage that the axial locking can be provided only within a narrow range, since at one end of the inner shaft the diameter of the spline teeth is larger than the diameter of the shaft. Accordingly, it is only possible to perform a length adjustment until the beginning of the spline teeth is reached.

Another longitudinally adjustable shaft coupling is known from German Pat. No. 1,808,076, which uses an elastic intermediate ring in combination with a clamping sleeve to provide the locking action in the axial direction. This arrangement, however, serves as sound damping, since vibrations within the range of movement are absorbed by the elastic ring. Furthermore, it is expected in this locking arrangement that certain small axial movements are not completely eliminated in the shaft parts.

In view of the disadvantages experienced in the past, it is the primary object of the present invention to provide a telescoping power take-off shaft with an axial length adjustment so that after the desired axial adjustment is made no subsequent change in the axial length of the shaft is possible. Additionally, the locking arrangement also provides a sealing action protecting the interior of the shaft from exterior influences.

In accordance with the present invention, an adapter sleeve is connected to the yoke supporting the inner shaft and encircles the outer shaft. A clamp nut is screwed onto the free end of the adapter sleeve. A retainer ring is provided within the clamp nut and fits around the outer surface of the outer or hollow shaft. When the clamp nut is tightened onto the adapter sleeve, one end of the retainer ring bears against the free end surface of the sleeve and the radially outer surface of the retainer ring is frusto-conically shaped and seats against a complementary shaped surface on the inner surface of the clamp nut. The frusto-conical surface on the clamp nut extends at an acute angle to the axis of the telescoping shaft and converges toward the shaft in the direction of the yoke to which the hollow or outer shaft is attached.

Due to the frusto-conically shaped radially outer surface of the retainer ring extending at an acute angle to the axis of the telescoping shaft, a radially directed high contact pressure can be achieved in the locking action. Such a construction is particularly useful in heavy machinery, since high axial forces are absorbed in such equipment.

Moreover, the locking assembly can be used for the entire range of longitudinal or axial adjustment, because the outer surface of the outer or hollow shaft on which the retainer ring acts is cylindrical. The spline teeth located in the interior of the outer or hollow shaft does not interfere with the locking action. Additionally, the locking assembly affords a sealing action provided by a sealing ring seated within the clamp nut and in enclosing engagement with the outer surface of the outer shaft.

For an exact predetermination of the locking arrangement to ensure that the axial forces can be absorbed and to ensure that a determination of the arrangement is possible without difficulty by computation, an essential feature of the invention is that the retainer ring is formed of metal, preferably steel.

To ensure that only small deformation forces are necessary to compensate for tolerances in the spline interconnection, the retainer ring is slotted in the axial direction.

Another feature of the invention is the provision of an axially extending portion of the adapter sleeve having a reduced thickness intermediate the ends of the sleeve as compared to the threaded end portion to which the clamp nut is secured.

It is advantageous for the adapter sleeve to be deformed when torque is applied. The applied torsional forces tighten the reduced wall thickness portion of the adapter sleeve until any play in the splined interconnection is overcome. As a result, it is ensured that the torque is transmitted from one end of the telescoping shaft to the other through the splined interconnection. Further, it is impossible for the torque to be transmitted through the parts forming the locking assembly.

To provide an improved sealing effect against water and dirt entering the interior of the telescoping shaft and, thereby preventing corrosion and wear, the interior surface of the clamp nut spaced from the adapter sleeve and the retainer ring has an annular groove in which a sealing ring is positioned.

To prevent against any loosening of the clamp nut, it is provided with a safety element. The safety element is a counter nut which, for reasons of simplified assembly is provided with the same thread as the clamp nut.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
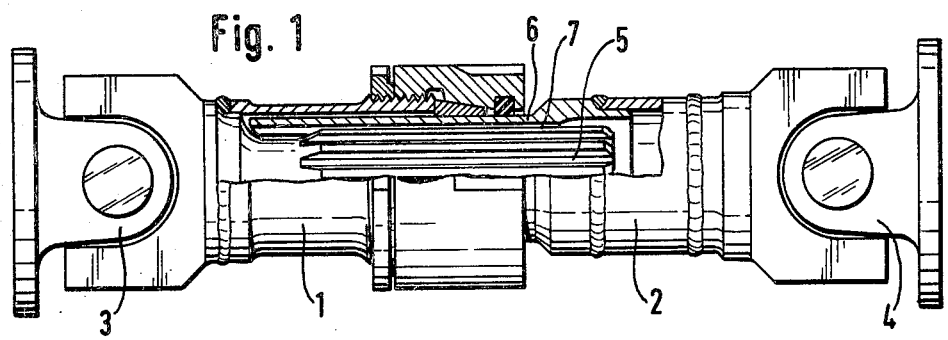
FIG. 1 is a side view of a telescoping power take off shaft, embodying the present invention, and shown partly in section.
Figure 2:
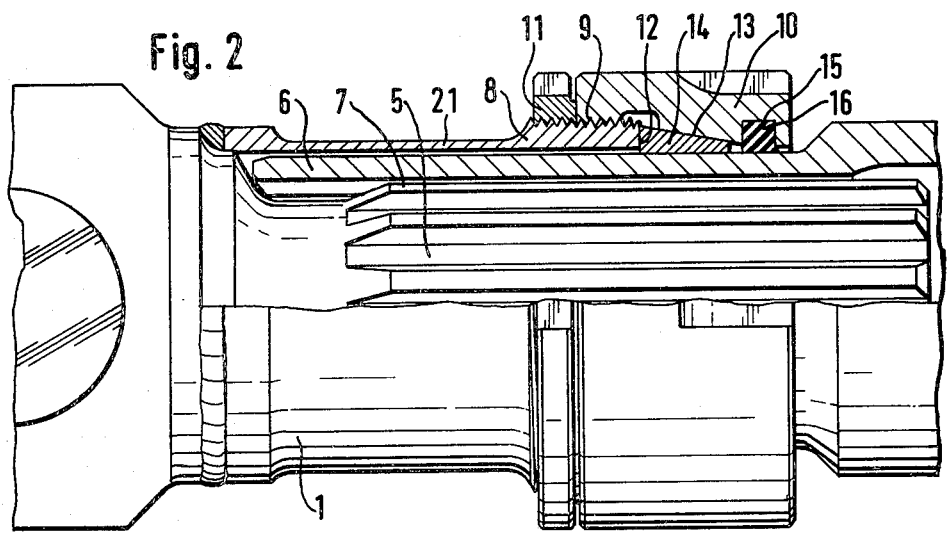
FIG. 2 is a side view, partly in section and on a larger scale of a portion of the telescoping power take off shaft illustrated in FIG. 1.

In FIG. 1 a telescoping power take-off shaft is shown comprising two coaxial telescoping shaft sections 1, 2. Each is connected at its outer end, that is, the opposie end from the telescoping ends, with a swivel joint 3, 4. The telescoping end of shaft section 1 is in the form of a solid shaft 5 while the corresponding telescoping end of the shaft section 2 is in the form of a hollow shaft 6. The outer surface of solid shaft 5 and the inner surface of hollow shaft 6 are connected to one another by splined surfaces 7 so that the two shafts can move axially relative to one another but cannot rotate relative one to the other. In FIG. 2 it is clearly shown that the solid shaft 5 is longitudinally or axially movably connected to the hollow shaft 6 via the spline teeth 7. Torque is transmitted from the swivel joint 3 to swivel joint 4 by the spline teeth 7. To afford a locking arrangement without preventing axial length adjustment, an adapter sleeve 8 is formed as part of shaft section 1, that is, the section which includes the solid shaft 5. Adapter sleeve 8 is coaxial with the solid shaft 5 and is spaced radially outwardly from the solid shaft and is rigidly connected to the yoke of the joint by a weld. At the opposite or free end of the clamping sleeve 8 from its attachment to the yoke, an external thread 9 is provided onto which a clamp nut 10 is screwed. The clamp nut 10 is threaded onto the thread 9 on the adapter sleeve by means of a corresponding counter thread and is secured by means of a counter nut 11. Between the free end face 12 of the adapter sleeve which extends transversely of the axis of the telescoping shaft and the frusto-conical interior surface 13 of the clamp nut 10 is a retainer ring 14. Note FIGS. 2 and 3. The inner surface of the retainer ring 14 fits around the outer surface of the hollow shaft 6 and the ring has an axially extending slot to compensate for finishing tolerances in the telescoping shaft. Adjacent the end of the clamp nut spaced from the adapter sleeve 8 is a groove 15 in which a sealing ring 16 is seated and provides a seal against the outer surface of the hollow shaft 6 for preventing dirt, water or other material from penetrating into the locking assembly.

Figure 3:
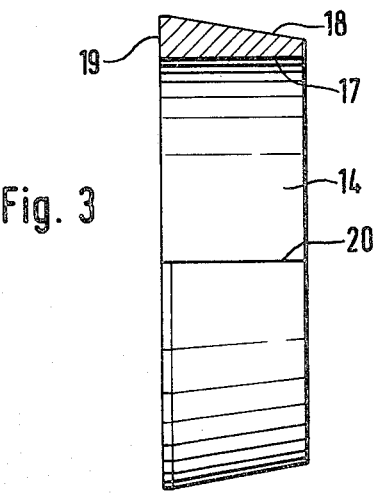
FIG. 3 is an enlarged detail view, partly in section, of a retainer ring as shown in FIG. 2.

FIG. 3 provides an enlarged detail view of the retainer ring 14. The ring 14 has a cylindrical bore which corresponds approximately to the outer diameter of the hollow shaft 6. The radially outer surface 18 of the ring 14 is frusto-conical and complementary to the corresponding inwardly facing frusto-conical surface 13 of the clamp nut 10. The end face 19 of the clamping ring is located at the larger diameter end of the ring and serves as a bearing surface against the end face 12 of the adapter sleeve 8. To assure that only small deformation forces are applied through the frusto-conical inner surface 13 of the clamp nut 10 to the complementary shaped outer surface 18 on the retainer ring 14, the retainer ring has an axially extending groove 20 located over its entire outer surface.

By applying torque to the clamp nut 20, a radially generated force is applied to the retainer ring 14 and this force provides the locking action on the two sections of the telescoping shaft due to the radially acting contact pressure of the retainer ring and the bearing force acting against the end face 12 of the adapter sleeve 8. Accordingly, after the assembly of the telescoping shaft and its alignment, when the length adjustment is locked, the shaft is ready for operation. To ensure during operation that the torque is transmitted through the splined teeth 7 from the hollow shaft 6 to the solid shaft 5, the adapter sleeve is provided with a reduced wall thickness for its center portion 21. Due to this arrangement, it is guaranteed that any possible play in the spline teeth 7 is compensated by the reduced wall thickness portion 21 of the adapter sleeve 8, since the torsional forces applied during torque transmission tighten the reduced wall thickness portion of the adapter sleeve until the play in the spline teeth 7 is overcome.

While specific embodiments of the invention have been shown and described in detail to illustrate the application of the inventive principles, it will be understood that the invention may be embodied otherwise without departing from such principles.

What is claimed is:

1. Telescoping power take-off shaft comprising a first swivel joint, a second swivel joint spaced from said first swivel joint, an axially extending telescoping shaft extending between said first and second swivel joints and a yoke on each end of said shaft for interconnecting said shaft to said joints, said telescoping shaft comprises an inner shaft connected to said yoke adjacent said first swivel joint, and an outer shaft connected to said yoke adjacent said second swivel joint, said outer shaft having an axially extending hollow portion forming a bore into which said inner shaft extends, each of said inner shaft and outer shaft has an axially extending spline section for interconnecting said shafts and affording longitudinal adjustment of the interconnection, wherein the improvement comprises an adapter sleeve attached to said yoke adjacent said first swivel joint and extending therefrom and laterally enclosing at least an axially extending part of said outer shaft, said adapter sleeve having a free end spaced axially from said yoke to which it is attached, a clamp nut laterally enclosing and in threaded engagement with the free end of said adapter sleeve, said clamp nut extending axially from the free end of said adapter sleeve toward said yoke adjacent said second swivel joint, a retainer ring encircling and mounted on said outer shaft and located within said clamp nut, said retainer ring having an axial bore with the surface of the bore in contact with the outer surface of said outer shaft, said retainer ring having a first end extending transversely of the axis of said telescoping shaft and located closer to the yoke adjacent said first swivel joint and a second end extending transversely of the axis of said telescoping joint and located closer to the yoke adjacent said second swivel joint, said first end disposed in contact with said free end of said adapter sleeve, said retainer ring having a radially outer surface extending between the first and second ends thereof and said outer surface is disposed at an acute angle to the axis of said telescoping shaft with said outer surface converging toward the axis in the direction toward the yoke adjacent said second swivel joint, and said clamp nut having an inner surface complementary to and in contact with said outer surface of said retainer ring.

2. Telescoping power take-off shaft, as set forth in claim 1, wherein said retainer ring is formed of a metal.

3. Telescoping power take-off shaft, as set forth in claim 2, wherein said retainer ring is formed of steel.

4. Telescoping power take-off shaft, as set forth in claim 1, wherein said retainer ring has an axially extending slot extending for the axial length of said retainer ring.

5. Telescoping power take-off shaft, as set forth in claim 1, wherein said adapter sleeve has a first axially extending portion extending from said yoke adjacent said first swivel joint, a second axially extending portion extending from said first portion toward said second swivel joint, and a third axially extending portion extending from said second portion to the free end of said sleeve, said clamp nut being in threaded engagement with said third portion and said third portion having a considerably greater radial wall thickness dimension than the radial wall thickness dimension of said second portion.

6. Telescoping power take-off shaft, as set forth in claim 1, including a seal ring fitted into the inner surface of said clamp nut between said retainer ring and said second swivel joint, and the radially inner surface of said seal ring is disposed in sealing engagement with the outer surface of said outer shaft.

7. Telescoping power take-off shaft, as set forth in claim 5, including a counter nut threaded onto the outer surface of said adapter sleeve between said clamp nut and said first swivel joint and said counter nut disposed in contacting engagement with the adjacent end of said clamp nut.

8. Telescoping power take-off shaft, as set forth in claim 1, wherein said adapter sleeve is welded to the yoke adjacent said first swivel joint.

* * * * *